United States Patent
Sakamoto

(10) Patent No.: US 9,591,199 B2
(45) Date of Patent: Mar. 7, 2017

(54) IMAGE PICKUP SYSTEM

(71) Applicant: CANON KABUSHIKI KAISHA, Tokyo (JP)

(72) Inventor: Masayuki Sakamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 14/537,292

(22) Filed: Nov. 10, 2014

(65) Prior Publication Data

US 2015/0130991 A1  May 14, 2015

(30) Foreign Application Priority Data

Nov. 12, 2013 (JP) ................................. 2013-234386

(51) Int. Cl.
*H04N 5/232* (2006.01)
*G03B 17/14* (2006.01)

(52) U.S. Cl.
CPC ......... *H04N 5/23203* (2013.01); *G03B 17/14* (2013.01); *H04N 5/23241* (2013.01); *G03B 2206/00* (2013.01); *G03B 2217/007* (2013.01)

(58) Field of Classification Search
None
See application file for complete search history.

(56) References Cited

U.S. PATENT DOCUMENTS

| | | | | |
|---|---|---|---|---|
| 6,141,037 A * | 10/2000 | Upton | ................ | A61B 1/00016 128/908 |
| 2003/0016417 A1* | 1/2003 | Lee | ........................ | G08C 23/04 398/106 |
| 2003/0030732 A1* | 2/2003 | Asada | .................... | H04N 5/232 348/231.4 |
| 2006/0119734 A1* | 6/2006 | Neel | .................. | H04N 1/00267 348/375 |
| 2010/0286938 A1* | 11/2010 | Kaneko | ............... | B60L 11/1855 702/63 |
| 2013/0329119 A1* | 12/2013 | Shigeta | .................... | G02B 7/09 348/345 |
| 2015/0077593 A1* | 3/2015 | Ito | ...................... | H04N 5/23296 348/240.3 |

FOREIGN PATENT DOCUMENTS

JP 09258293 A 10/1997
JP 2011257542 A 12/2011

* cited by examiner

*Primary Examiner* — Michael Osinski
(74) *Attorney, Agent, or Firm* — Rossi, Kimms & McDowell LLP

(57) ABSTRACT

Provided is a lens apparatus which is communicable with a drive unit including: a movable optical member; and a first communication unit which is communicable with the drive unit, wherein the first communication unit receives an electric power supply different from an electric power supply which supplies an electric power to the drive unit, and wherein the first communication unit is configured to send/receive signals to/from the drive unit in an electrically noncontact manner.

11 Claims, 2 Drawing Sheets

IMAGE PICKUP SYSTEM

BACKGROUND OF THE INVENTION

Field of the Invention

The present invention relates to an image pickup system, and more particularly, to an image pickup system configured to carry out communication between modules that operate with different power supplies so as to stably operate the modules.

Description of the Related Art

Hitherto, a terminal is formed between a camera body and a lens barrel connected thereto, which enables supply of power from the camera body to the lens barrel and transfer of positional information of, for example, an optical member formed in the lens barrel. On the other hand, a driving unit connected to the lens barrel includes a motor for driving the optical member formed in the lens barrel and a sensor for positional detection of the optical member, and further includes a unit for securing power supply for operating the motor and the sensor.

For example, Japanese Patent Application Laid-Open No. H09-258293 discloses a technology in which a terminal is provided at a connecting portion between the camera body and the lens barrel for supply of power to the lens barrel and for transfer of information on the lens barrel. Further, Japanese Patent Application Laid-Open No. 2011-257542 discloses a technology in which a commercial power supply is connected to the driving unit to drive the optical member formed in the lens barrel.

In this case, when a position sensor is not formed in the lens barrel, the lens barrel cannot transfer the positional information to the camera body. On the other hand, a position sensor is formed in the driving unit that can be connected to the lens barrel. Therefore, the lens barrel can transfer the positional information to the camera body by transferring information obtained by the position sensor to the lens barrel.

However, when wired communication is carried out between the lens barrel and the driving unit, GNDs of different power supplies are connected to each other, which may cause unstable operation of the lens barrel and the driving unit, leading to a malfunction.

SUMMARY OF THE INVENTION

Accordingly, it is an object of the present invention to provide an image pickup system configured to carry out communication between a lens barrel and a driving unit that operate with different power supplies, which enables stable operation without a malfunction. According to one embodiment of the present invention, there is provided a lens apparatus which is communicable with a drive unit including: a movable optical member; and a first communication unit which is communicable with the drive unit, wherein the first communication unit receives an electric power supply different from an electric power supply which supplies an electric power to the drive unit, and wherein the first communication unit is configured to send/receive signals to/from the drive unit in an electrically noncontact manner.

According to one embodiment of the present invention, it is possible to provide the image pickup system configured to carry out communication between the lens barrel and the driving unit that operate with different power supplies, which enables stable operation without a malfunction.

Further features of the present invention will become apparent from the following description of exemplary embodiments with reference to the attached drawings.

DESCRIPTION OF THE EMBODIMENT

Figure 1:
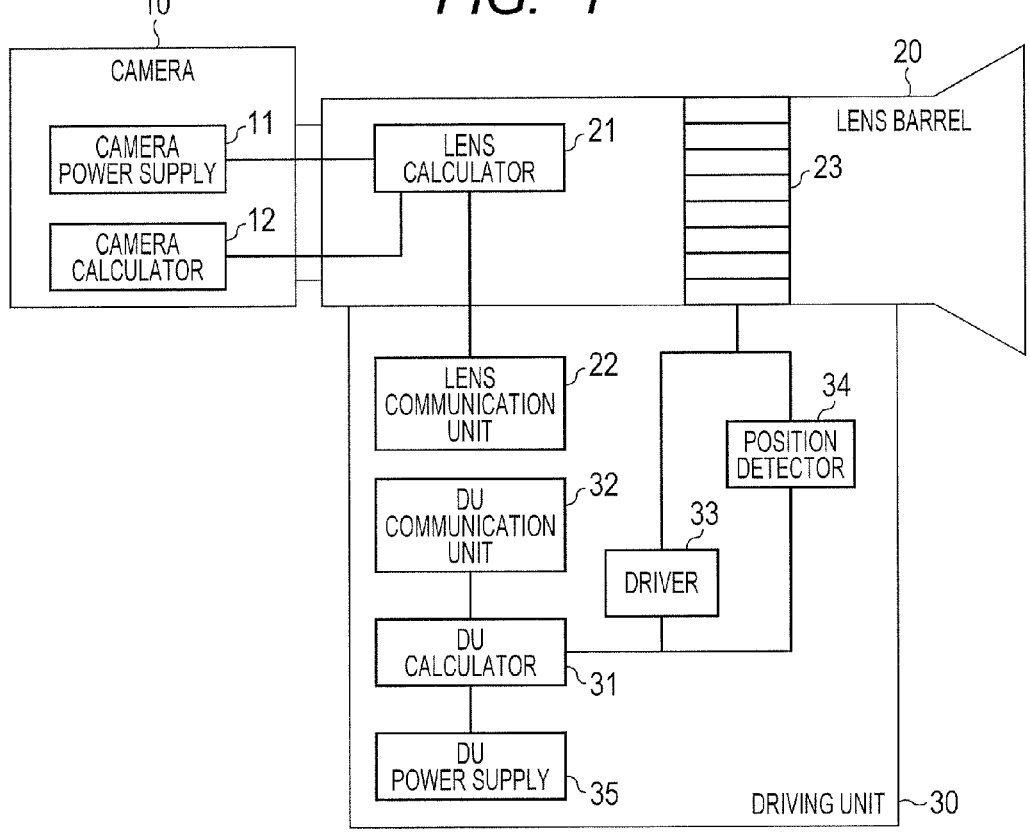
FIG. 1 is a block diagram illustrating a first embodiment according to the present invention.

An image pickup system according to an exemplary embodiment of the present invention is now described in detail with reference to the attached drawings. FIG. 1 is a block diagram illustrating an embodiment of the present invention.

First Embodiment

A first embodiment of the present invention is described in the following with reference to FIG. 1, which is a block diagram illustrating a structure of the first embodiment.

An image pickup system includes a camera 10 for receiving subject light from a lens and a lens barrel 20. By connecting the lens barrel 20 and the camera 10, the image pickup system picks up an image of the subject.

The camera 10 includes a camera calculator (controller) 12 and a camera power supply 11. The camera power supply 11 can supply power to the lens barrel 20.

The lens barrel 20 includes a lens calculator (first controller) 21. The lens calculator 21 is connected to the camera power supply 11 and the camera calculator 12. This structure enables the lens calculator 21 to be supplied with power from the camera power supply 11 and to communicate to/from the camera calculator 12. The lens calculator 21 can output a status of a switch (not shown) in the lens barrel 20 and a status of an optical member in the lens barrel 20. In this way, the lens calculator 21 can transfer information on the inside of the lens barrel 20 to the camera calculator 12.

In a structure in which the camera 10 and the lens barrel 20 are connected to each other, an image pickup apparatus configured so that the optical member in the lens barrel 20 is manually operated may be employed.

A driving unit 30 for controlling drive of a movable optical member is connected to the lens barrel 20. In the image pickup system of the present invention, a drive control signal for and positional information on a stop as the movable optical member are transmitted and received between the image pickup apparatus (the camera 10 and the lens barrel 20) and the driving unit 30 via a communicating part that carries out communication in an electrically non-contact manner. The communicating part includes a pair of communication units, which are a lens communication unit 22 and a DU communication unit 32. The lens communication unit 22 (one of the pair of communication units) is connected to the lens calculator 21 of the lens barrel 20 via a connecting unit (not shown), and the DU communication unit 32 (the other of the pair of communication units) is connected to a DU calculator (second controller) 31 of the driving unit 30.

Note that, in this block diagram, the camera power supply 11 is representatively connected to the lens calculator 21, and, when the driving unit 30 and the lens barrel 20 are connected to each other, the camera power supply 11 supplies power also to the lens communication unit 22 that is connected to the lens calculator 21 via the connecting unit (not shown). This enables supply of power to the lens communication unit 22 that is independent of a DU power supply 35 in the driving unit 30, and enables noncontact communication between the lens communication unit 22 and the DU communication unit 32.

The lens barrel 20 includes a stop 23 as a drivable optical member that enables adjustment of brightness of an image picked up by the camera 10. Note that, in this embodiment, the stop 23 is described as an example of a member that can be power-driven, but the same advantageous effect can be obtained when the power-driven member is a focusing part for adjusting a focus or a zooming part for adjusting a focal length.

The driving unit 30 includes the DU calculator 31, a driver 33, and a position detector 34. The driver 33 drives the stop 23. The position detector 34 detects a position of the stop 23. The DU calculator 31 is connected to the driver 33 and the position detector 34 to control drive of the stop 23 and to obtain positional information of the stop 23.

The driving unit 30 includes the DU communication unit 32 that is connected to the DU calculator 31. The DU communication unit 32, together with the lens communication unit 22, constructs the communicating part, and the communicating part carries out noncontact communication between the lens calculator 21 and the DU calculator 31. Noncontact communication as used herein means communication between electrically independent units such as wireless communication (communication using electric wave) or optical communication between a light receiver and a light emitter. Further, in this embodiment, the lens communication unit 22 and the DU communication unit 32 are described as different structures, but one component in which those are packaged, for example, a photo-coupler, may also be used.

The driving unit 30 includes the DU power supply 35. The DU power supply 35 can supply power to the driving unit 30 by being connected to an external power source (not shown). In this block diagram, the power supply 35 is schematically connected to the DU calculator 31, but the DU power supply 35 supplies power also to the DU communication unit 32, the driver 33, and the position detector 34, which are connected to the DU calculator 31. Power necessary for the driving unit 30 to drive the movable optical member is larger than power necessary for the camera 10 and the lens barrel 20. In the case of motion picture filming with a large image size, the optical member to be driven becomes larger accordingly, and thus, power necessary for driving the movable optical member becomes particularly larger. When power is supplied from the camera 10 side to the driving unit 30 that requires large power, the power on the camera 10 side becomes unstable, which may affect control of image pickup, but, according to the present invention, by preparing the power supply for the camera 10 and the power supply for the driving unit 30 separately from each other, stable operation can be secured.

Such a structure enables the lens calculator 21 to obtain positional information on the stop 23 formed in the lens barrel via the DU communication unit 32 and the lens communication unit 22 and to transfer the positional information to the camera calculator 12. Further, the lens communication unit 22 and the DU communication unit 32 that are formed in the driving unit 30 can have their own power supplies separately from each other, and thus, a malfunction that may be caused in the case of wired connection can be prevented.

Figure 2:
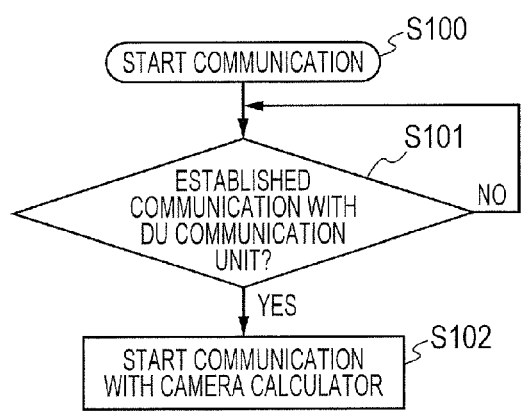
FIG. 2 is a flow chart illustrating exemplary processing carried out by a lens calculator of the first embodiment.

Exemplary processing for starting communication to/from the camera calculator 12, which is carried out by the lens calculator 21, is described in the following with reference to a flow chart of FIG. 2.

This processing is carried out in accordance with a computer program stored in the lens calculator 21. Further, when the processing for starting communication to/from the camera calculator 12 is started, communication start processing in Step S100 is started, and the procedure proceeds to Step S101.

In Step S101, it is determined whether or not communication to/from the DU communication unit 32 via the lens communication unit 22 is established. When the communication is established, the procedure proceeds to Step S102, and, when the communication is not established, the procedure returns to Step S101.

In Step S102, communication to/from the camera calculator 12 is started.

When the DU power supply 35 is not connected to a power supply, communication between the lens communication unit 22 and the DU communication unit 32 is disconnected. In this state, the lens calculator 21 cannot transfer correct positional information on the stop 23 to the camera calculator 12. Under a state in which the DU power supply 35 is not connected to the power supply, communication to/from the camera calculator 12 can be disconnected through operation as illustrated in the flow chart of FIG. 2. Therefore, incorrect positional information is prevented from being transferred to the camera calculator 12.

By the structure described above, communication can be carried out between a lens barrel and a driving unit that operate with different power supplies, and stable operation can be performed without a malfunction.

Figure 3:
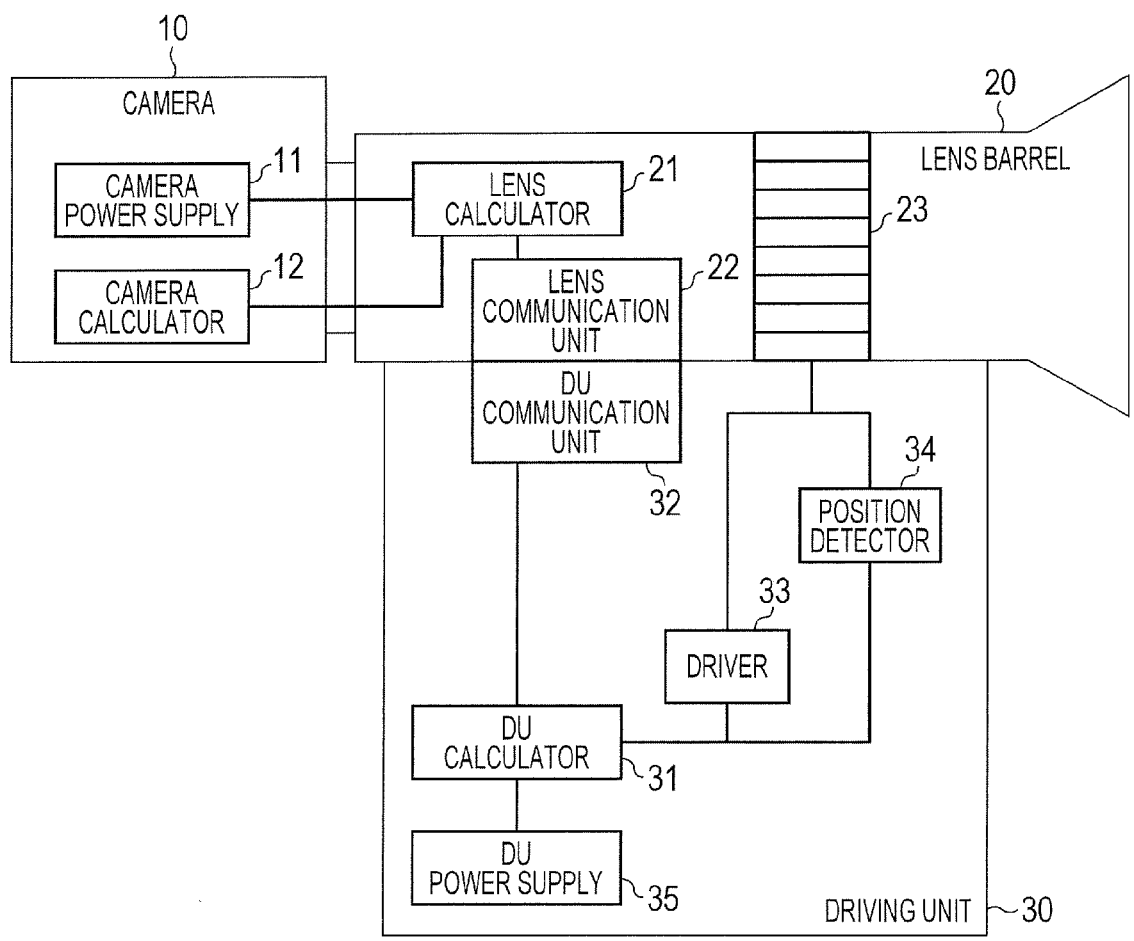
FIG. 3 is a block diagram illustrating another structure of the first embodiment.

Note that, in this embodiment, the lens communication unit 22 and the DU communication unit 32 are formed in the driving unit 30, but both of them may be formed in the lens barrel 20 (in the image pickup apparatus). Alternatively, as illustrated in FIG. 3, only the lens communication unit 22 may be formed in the lens barrel 20 and, when the driving unit 30 and the lens barrel 20 are connected to each other, wireless communication may be carried out between the lens communication unit in the lens barrel 20 and the DU communication unit in the driving unit. Also in this structure, the same advantageous effect can be obtained.

The DU communication unit 32 in the driving unit 30 may be configured to carry out wireless communication to/from a camera communication unit that is formed in the camera 10 (in the image pickup apparatus) and that can carry out wireless communication. Further, a camera communication unit that can carry out wireless communication to/from the DU communication unit 32 may be formed in the driving unit 30, and the camera communication unit may be configured to carry out wired connection to the camera 10 so as to be supplied with power from the camera 10 (in the image pickup apparatus), and so as to be able to output a control signal received from the DU communication unit to the camera calculator 12.

It is possible to provide an image pickup system structured in this way, which is configured to carry out communication between a lens barrel and a driving unit that operate with different power supplies so as to stably operate the lens barrel and the driving unit without a malfunction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234386, filed Nov. 12, 2013, which is hereby incorporated by reference herein in its entirety.

What is claimed is:

1. A drive unit which is communicable with a lens apparatus, the drive unit comprising:
   a driver that drives a movable optical member;
   a first communicator which is connected to the lens apparatus; and
   a second communicator that is communicable with the lens apparatus through a wireless communication with the first communicator,
   wherein the first communicator receives an electric power supply different from an electric power supply which supplies an electric power to the drive unit, and
   wherein the first communicator is configured to send and receive signals to and from the second communicator while the first communicator is not electrically connected to the second communicator.

2. The drive unit according to claim 1, wherein the first communicator sends and receives signals to and from a controller of the drive unit which controls driving of the movable optical member in an electrically noncontact manner with the drive unit.

3. The drive unit according to claim 1, comprising a second controller configured to control driving of the movable optical member,
   wherein the second controller is configured to be communicable with a first controller which is disposed in the lens apparatus and controls driving of the movable optical member by a communication between the first communicator and the second communicator.

4. A lens system, comprising:
   a lens apparatus comprising a movable optical member;
   a drive unit which is communicable with the lens apparatus, the drive unit comprising:
      a driver that drives the movable optical member;
      a first communicator which is connected to the lens apparatus; and
      a second communicator that is communicable with the lens apparatus through a wireless communication with the first communicator,
   wherein the first communicator receives an electric power supply different from an electric power supply which supplies an electric power to the drive unit,
   wherein the first communicator is configured to send and receive signals to and from the second communicator while the first communicator is not electrically connected to the second communicator, and
   wherein the lens apparatus and the drive unit are driven with power supplies independent of each other.

5. The lens system according to claim 4,
   wherein the lens apparatus comprises a first controller configured to control driving of the movable optical member, and
   wherein the drive unit comprises
   a second controller configured to control the driver.

6. The lens system according to claim 5,
   wherein the drive unit comprises a detector configured to detect a state of the movable optical member, and
   wherein the first controller and the second controller communicate information generated based on the state detected by the detector as the signal via the first communicator and the second communicator.

7. The lens system according to claim 5,
   wherein the first controller and the second controller communicate a drive control signal transmitted from the first controller as the signal via the first communicator and the second communicator, and
   wherein the second controller drives the movable optical member based on the drive control signal.

8. The lens system according to claim 4, wherein the first communicator and the second communicator comprise a photo-coupler.

9. The lens system according to claim 4, wherein the first communicator and the second communicator comprise a light receiver and a light emitter.

10. The lens system according to claim 4, wherein the first communicator and the second communicator comprise a wireless communicator.

11. An image pickup system comprising a lens system, and a camera having an image pickup element which picks up an image of an object formed by the lens system, wherein the lens system comprises:
    a lens apparatus comprising a movable optical member;
    a drive unit which is communicable with the lens apparatus, the drive unit comprising:
       a driver that drives the movable optical member;
       a first communicator which is connected to the lens apparatus; and
       a second communicator that is communicable with the lens apparatus through a wireless communication with the first communicator,
    wherein the first communicator receives an electric power supply different from an electric power supply which supplies an electric power to the drive unit,
    wherein the first communicator is configured to send and receive signals to and from the second communicator while the first communicator is not electrically connected to the second communicator, and wherein the lens apparatus and the drive unit are driven with power supplies independent of each other.

* * * * *